United States Patent [19]

Furuya

[11] Patent Number: 5,221,999
[45] Date of Patent: Jun. 22, 1993

[54] AUTOMOTIVE DISPLAY APPARATUS

[75] Inventor: Yoshiyuki Furuya, Shizuoka, Japan

[73] Assignee: Yazaki Corporation, Tokyo, Japan

[21] Appl. No.: 902,023

[22] Filed: Jun. 22, 1992

[30] Foreign Application Priority Data

Jun. 24, 1991 [JP] Japan .............................. 3-047574[U]

[51] Int. Cl.$^5$ ................................................ G02B 5/08
[52] U.S. Cl. ...................................... 359/839; 359/436;
359/601; 362/28; 362/297
[58] Field of Search ............... 359/601, 602, 603, 609,
359/608, 613, 436, 479, 839, 871, 894; 362/23,
28, 29, 30, 296, 297, 301, 310, 311; 340/705

[56] References Cited

U.S. PATENT DOCUMENTS

| | | |
|---|---|---|
| 4,225,215 | 9/1980 | Cojan .............................. 359/839 |
| 4,978,196 | 12/1990 | Suzuki et al. ..................... 359/839 |
| 5,013,135 | 5/1991 | Yamamura ........................ 359/601 |
| 5,039,213 | 8/1991 | Yamada et al. ................... 359/839 |

Primary Examiner—Loha Ben
Attorney, Agent, or Firm—Armstrong, Westerman, Hattori, McLeland & Naughton

[57] ABSTRACT

The automotive display apparatus consists of an indicator, a transmissive first reflector plate, a second reflector plate, and a face plate. The face plate has a rear surface the upper portion of which is inclined at an angle larger than the inclined angle of the remaining portion of the rear surface. If light from a display of the indicator is inadvertently directly passed onto the upper portion of the rear surface of the face plate, the upper portion reflects the light to form an eventually ghost-causing virtual image at such a position that the ghost does not enter into a viewing area for the indicator display. The automotive display apparatus does not require an extra spc to provide a display free of ghost and is produceable at a low cost.

4 Claims, 3 Drawing Sheets

AUTOMOTIVE DISPLAY APPARATUS

BACKGROUND OF THE INVENTION

1. Field of the Invention

The present invention relates to an automotive display apparatus and more particularly to an automotive display apparatus wherein light from a display of an indicator is passed through a transmissive first reflector plate onto a second reflector plate, reflected by the second reflector plate toward the first reflector plate, and then further reflected by the first reflector plate toward an eye range of a driver by way of a face plate disposed between the first reflector plate and the eye range, which face plate is inclined toward the side opposite to the eye range. An image of the indicator display may be viewed from the eye range as a remote virtual image within a viewing area on the first reflector plate. The above-mentioned construction provides a good remote display effect without increasing the overall size of the apparatus.

2. Description of the Prior Art

An example of such an automotive display apparatus is shown in FIG. 2. In the figure, denoted 11 is a dashboard, in which is installed a light-emitting indicator 12, such as a liquid crystal display or a fluorescent display tube, for displaying thereon information on driving conditions such as a speed of a vehicle. On the display surface side of the indicator 12 is disposed a transmissive reflector plate 13, which allows the light of display from the indicator 12 to pass therethrough. Opposingly positioned to the indicator 12 by way of the reflector plate 13 is a mirror 14.

At the front of the dashboard 11 is provided a face plate 15 having a concave configuration for the protection of the reflector plate 13 and mirror 14 and for keeping them free from dust, the reflector plate 13 and mirror 14 otherwise tending to collect dust to deteriorate the quality and recognizability of the image displayed. The face plate 15 is, for example, formed of a dark color transparent smoked acrylic resin and is inclined in a direction opposite to the driver side such that the center $O_1$ of the circle defined by the curvature of the face plate 15 is located upwardly on the driver side.

In order to keep ambient light from entering into the indicator 12, a hood 11a is provided to the dashboard 11 and a shading plate 16 is provided so as to extend between the reflector plate 13 and the indicator 12.

When the light of display is emitted from the indicator 12, it passes through the reflector plate 13 and is totally reflected by the mirror 14. The thus totally reflected light is then further reflected by the reflector plate 13 toward the eye range 21 on the driver's seat side from inside which the driver can recognize the image displayed.

As a result, when the reflector plate 13 is looked in from the eye range 21, the image of the indicator display is viewed as a virtual image X in a view area $A_1$ behind the reflector plate 13. The view area $A_1$ is defined in the figure by a first line that passes through the upper end 21U of the eye range 21 and the lower end of the mirror 14 reflected in the reflector plate 13 and a second line that passes through the lower end 21D of the eye range 21 and the upper end of the mirror 14 reflected in the reflector plate 13.

The virtual image X is formed inside the boundary of the mirror 14 reflected in the reflector plate 13 and at a position remote by a distance corresponding to the overall length of the light path, thus providing a good remote display effect.

In this instance, however, part of the light from a display of the indicator 12 is directly passed through the reflector plate 13 onto the face plate 15 at its rear upper portion $A_2$. The rear upper portion $A_2$ is defined in the figure above the intersection of the face plate 15 with a line drawn through the upper edge of the shading plate 16 and the right side of the display surface of the indicator 12.

The light of display directly incident on the rear upper portion $A_2$ of the face plate 15 is reflected thereby to form a virtual image $X_1$, which in turn is reflected by the reflector plate 13 to form a virtual image $X_2$. The virtual image $X_2$ is further reflected by the mirror 14 to form a virtual image $X_3$, and the virtual image $X_3$ by the reflector plate 13 to form a virtual image $X_4$, which is located inside the view area $A_1$.

Consequently, when viewed from the eye range 21, the virtual image $X_4$ is recognized as a ghost below the virtual image X in the viewing area on the reflector plate 13, as shown in FIG. 3, resulting in deterioration of the quality and recognizability (or contrast) of the virtual image X.

One of the countermeasures employed in a conventional automotive display apparatus is to install the indicator 12 at a lowered position in the dashboard 11 such that the light of display from the indicator 12 does not fall on and is not reflected by the rear upper portion of the face plate 15. This countermeasure, however, requires an extra space and results in restriction of a freedom in designing. An alternative countermeasure is to apply the rear of the face plate 15 where the light of display is directly incident with AR coating (non-reflective coating) so as to reduce the light reflected thereby. This countermeasure, however, is costly.

SUMMARY OF THE INVENTION

The present invention has been accomplished to overcome the above drawbacks of the prior art and its object is to provide an automotive display apparatus which requires no extra space and is produceable at a low cost and in which the formation of the ghost is prevented.

To achieve the above object, an automotive display apparatus according to this invention comprises: an indicator, a transmissive first reflector plate allowing light of display emanated from the indicator to pass therethrough, a second reflector plate reflecting back the light of display passed through the first reflector plate toward the first reflector plate, the first reflector plate in turn reflecting the light of display toward an eye range of a driver so that from inside the eye range an image displayed by the indicator is viewed as a virtual image within a viewing area on the first reflector plate, and a face plate disposed between the first reflector plate and the eye range, the face plate being inclined toward the side opposite to the eye range and having a rear surface onto an upper portion of which the light of display from the indicator is directly passed through the first reflector plate, wherein the upper portion is inclined at an angle larger than that at which other portions of the rear surface of the face plate are inclined.

With the construction as mentioned above, when the light from a display of the indicator is partially directly passed onto and reflected by the rear upper portion of the face plate, the virtual image-formed position is different than in the prior art. Likewise, the positions are also different at which virtual images are formed through subsequent reflections by the first, second and again first reflector plates, with the result that the ghost-causing virtual image is not recognized as a ghost inside the viewing area on the first reflector plate.

PREFERRED EMBODIMENTS OF THE INVENTION

Figure 1:
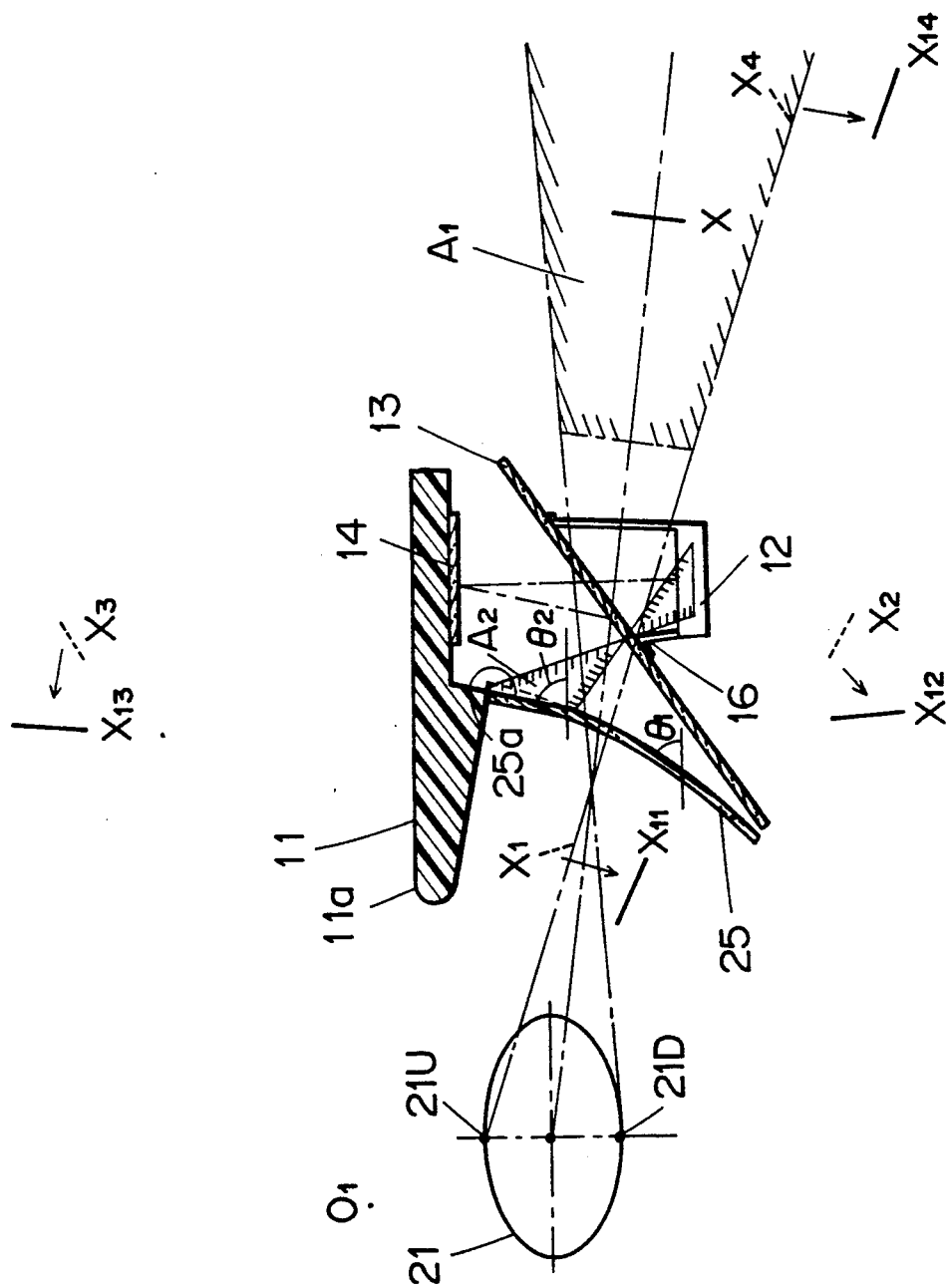
FIG. 1 is a schematic diagram showing an automotive display apparatus embodying the invention.
Figure 2:
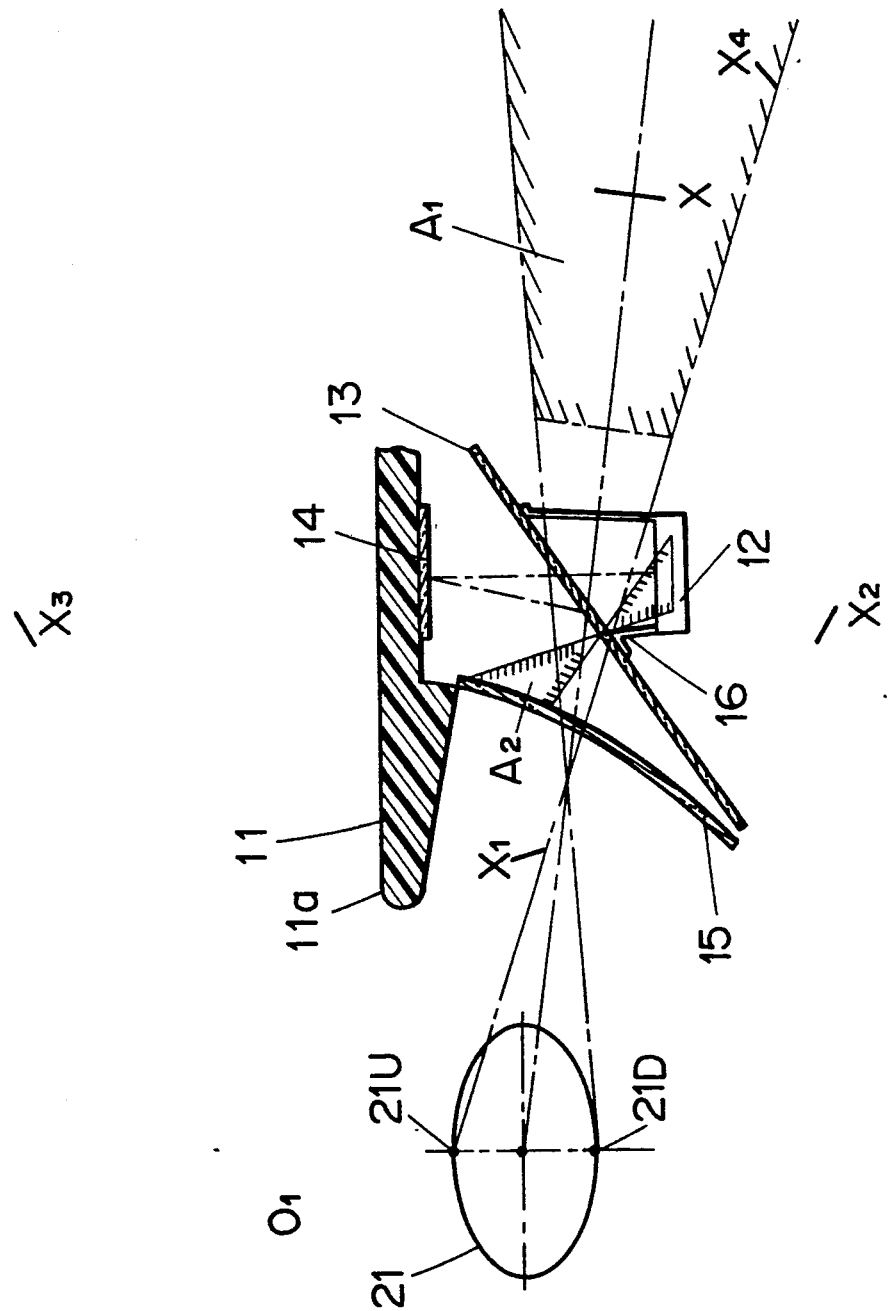
FIG. 2 is a schematic diagram showing a conventional automotive display apparatus.
Figure 3:
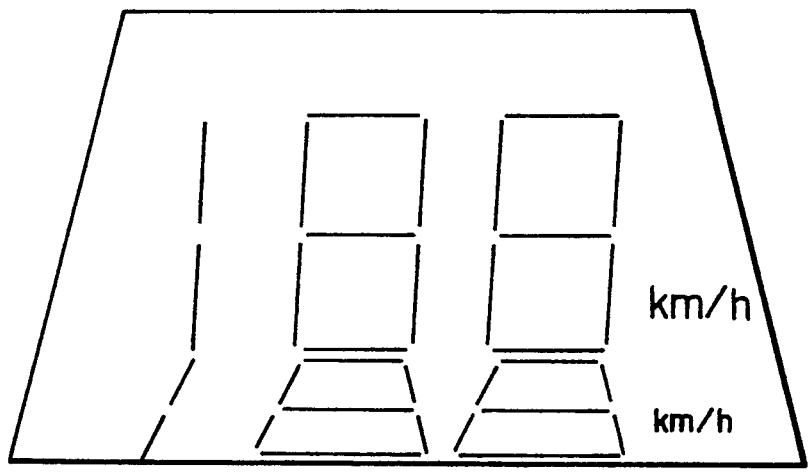
FIG. 3 is a schematic view showing an image displayed by the automotive display apparatus of FIG. 2.

Embodiment of an automotive display apparatus according to the present invention will now be described with reference to FIG. 1. Components identical with those of the previously described prior art display apparatus are given like reference numerals and their description will be omitted.

In FIG. 1, a face plate 25 is identical in structure with the previously described prior art face plate 15 with a concave configuration except for its rear upper portion 25a where the light from a display of the indicator 12 is directly passed and reflected. The rear upper portion 25a is defined in the figure above the intersection of the face plate 25 with a line drawn through the upper end of the shading plate 16 and the right side of the display surface of the indicator 12. The rear upper portion 25a is formed with a curvature smaller than that of the other rear portion of the face plate 25 so that the angle $\theta_2$ at which the rear upper portion 25a is inclined is larger than the inclined angle $\theta_1$ of the other rear portion.

With a display apparatus having the construction as mentioned above, when the light of display is emanated from the indicator 12, it is passed through the reflector plate 13 onto the mirror 14, which reflects back the light of display toward the reflector plate 13. The reflected light of display is then further reflected by the reflector plate 13 toward the eye range 21 of the driver wherefrom he or she may visually recognize the image of the indicator display.

As a result, when the reflector plate 13 is looked in from the eye range 21, the image displayed is viewed as a virtual image X in the view area $A_1$ behind the reflector plate 13. The virtual image X formed inside the boundary of the mirror 14 is reflected in the reflector plate 13 and at a position remote by a distance corresponding to the length of the light path, thereby providing a good remote display effect.

In this instance, part of the light of display from the indicator 12 is directly passed through the reflector plate 13 onto the rear upper portion 25a of the face plate 25 and is reflected thereby, causing formation of a virtual image $X_{11}$ at a position indicated in the drawing. The virtual image $X_{11}$ is in turn reflected by the reflector plate 13 to form a virtual image $X_{12}$.

The thus formed virtual image $X_{12}$ is further reflected by the mirror 14 to form a virtual image $X_{13}$, and the virtual image $X_{13}$ by the reflector plate 13 to form a virtual image $X_{14}$, which is, unlike the prior art, formed at a position outside the view area $A_1$ as shown in the figure.

As a result, when the virtual image X is viewed, the ghost-causing virtual image $X_{14}$ is not recognized as a ghost in the viewing area on the reflector plate 13, thereby enhancing the contrast and visibility of the virtual image X.

While in the embodiment described above the rear upper portion 25a of the face plate 25 is formed with a curvature smaller than that of the remaining rear portion of the face plate 25, the rear upper portion 25a may have the same curvature and may simply be bent so that it is inclined at an angle ($\theta_2$) larger than the inclined angle ($\theta_1$) of the other rear portion of the face plate 25. Further, in place of a concave configuration, the face plate 25 may have a plane configuration with a plane surface at its rear, provided that the plane surface at the rear of the face plate is bent so that the upper portion 25a is inclined at an angle ($\theta_2$) larger than the inclined angle of the remaining portion of the plane surface.

As described hereinabove, according to the present invention, an image of the indicator display is made free of a ghost by simply having the rear upper portion of the face plate inclined at an angle greater than the inclined angle of other rear portions of the face plate and changing the positions where the ghost-causing virtual images are formed. Thus, an automotive display apparatus capable of providing a display free of a ghost is obtained without requiring an extra space and at a low cost.

What is claimed is:

1. An automotive display apparatus comprising:
   an indicator;
   a transmissive first reflector plate allowing light of display emanated from said indicator to pass therethrough;
   a second reflector plate reflecting back the light of display passed through said first reflector plate toward said first reflector plate, said first reflector plate in turn reflecting the light of display toward an eye range of a driver so that from inside the eye range an image displayed by said indicator is viewed as a virtual image within a viewing area on said first reflector plate; and
   a face plate disposed between said first reflector plate and the eye range, said face plate being inclined toward the side opposite to the eye range and having a rear surface onto an upper portion of which the light of display from said indicator is directly passed through said first reflector plate,
   wherein said upper portion is inclined at an angle larger than that at which other portions of the rear surface of the face plate are inclined.

2. An automotive display apparatus as claimed in claim 1, wherein said rear surface of the face plate is curved toward the side opposite to the eye range and said upper portion has a curvature smaller than that of other portions of the rear surface of the face plate.

3. An automotive display apparatus as claimed in claim 1, wherein said rear surface of the face plate is curved toward the side opposite to the eye range and said upper portion is bent with respect to other portions of the rear surface of the face plate.

4. An automotive display apparatus as claimed in claim 1, wherein said rear surface of the face plate is plane and said upper portion is bent with respect to other portions of the rear surface of the face plate.

* * * * *